(12) United States Patent
Rao

(10) Patent No.: US 11,740,869 B2
(45) Date of Patent: Aug. 29, 2023

(54) SCHEDULING ATOMIC FIELD OPERATIONS IN JACOBIAN COORDINATES USED IN ELLIPTIC CURVE CRYPTOGRAPHY SCALAR MULTIPLICATIONS

(71) Applicant: International Business Machines Corporation, Armonk, NY (US)

(72) Inventor: Rajat Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 17/242,353

(22) Filed: Apr. 28, 2021

(65) Prior Publication Data

US 2022/0350640 A1    Nov. 3, 2022

(51) Int. Cl.
*G06F 7/523* (2006.01)
*G06F 7/57* (2006.01)
*H04L 9/30* (2006.01)
*G06F 7/50* (2006.01)

(52) U.S. Cl.
CPC ............ *G06F 7/523* (2013.01); *G06F 7/50* (2013.01); *G06F 7/57* (2013.01); *H04L 9/3066* (2013.01)

(58) Field of Classification Search
CPC ... G06F 7/523; G06F 7/50; G06F 7/57; G06F 7/485; G06F 7/4876; G06F 7/544; H04L 9/3066
See application file for complete search history.

(56) References Cited

U.S. PATENT DOCUMENTS

| 5,204,829 A * | 4/1993 | Lyu ........................... G06F 7/57 708/503 |
| 5,781,457 A * | 7/1998 | Cohen ..................... G06F 7/764 708/231 |
| 2010/0011047 A1* | 1/2010 | Jackson .................... H04L 9/06 708/670 |

(Continued)

OTHER PUBLICATIONS

"Elliptic curve cryptography on embedded multicore systems", Fan et al. (Year: 2008).*

(Continued)

*Primary Examiner* — Farley Abad
(74) *Attorney, Agent, or Firm* — Cantor Colburn LLP; Edward Wixted

(57) ABSTRACT

Embodiments are directed to selecting a multiplication operation to be scheduled in a first stage of an execution schedule, the multiplication operation meeting a first condition of having no dependency. An addition/subtraction operation is selected to be scheduled in the first stage of the execution schedule responsive to meeting the first condition. A process is performed which includes selecting another multiplication operation to be scheduled in a next stage of the execution schedule responsive to meeting the first condition or a second condition, the second condition including having a dependency that is fulfilled by a previous stage. The process includes selecting another addition/subtraction operation to be scheduled in the next stage of the execution schedule responsive to meeting the first or second condition, and repeating the process until each operation has been scheduled in the execution schedule, where the execution schedule is configured for execution by an arithmetic logic unit.

20 Claims, 16 Drawing Sheets

(56) References Cited

U.S. PATENT DOCUMENTS

| | | | |
|---|---|---|---|
| 2010/0172492 A1* | 7/2010 | Lai | H04L 9/3066 |
| | | | 718/104 |
| 2015/0180664 A1 | 6/2015 | Knezevic et al. | |
| 2017/0272237 A1 | 9/2017 | Gueron | |
| 2018/0337780 A1 | 4/2018 | Ghosh et al. | |
| 2020/0044817 A1 | 2/2020 | Soukharev et al. | |

OTHER PUBLICATIONS

Guneysu, "Ultra High Performance ECC over NIST Primes on Commercial FPGAs". CHES 2008, LNCS 5154, pp. 62-78, 2008. 17p.

Hankerson, "Guide to Elliptic Curve Cryptography". Springer-Verlag New York Inc. 2004. 332 p.

Kim; "New Fast Algorithms for Arithmetic on Elliptic Curves over Finite Fields of Characteristic Three"; Masters Abstracts International, 2007; 13 pages.

\* cited by examiner

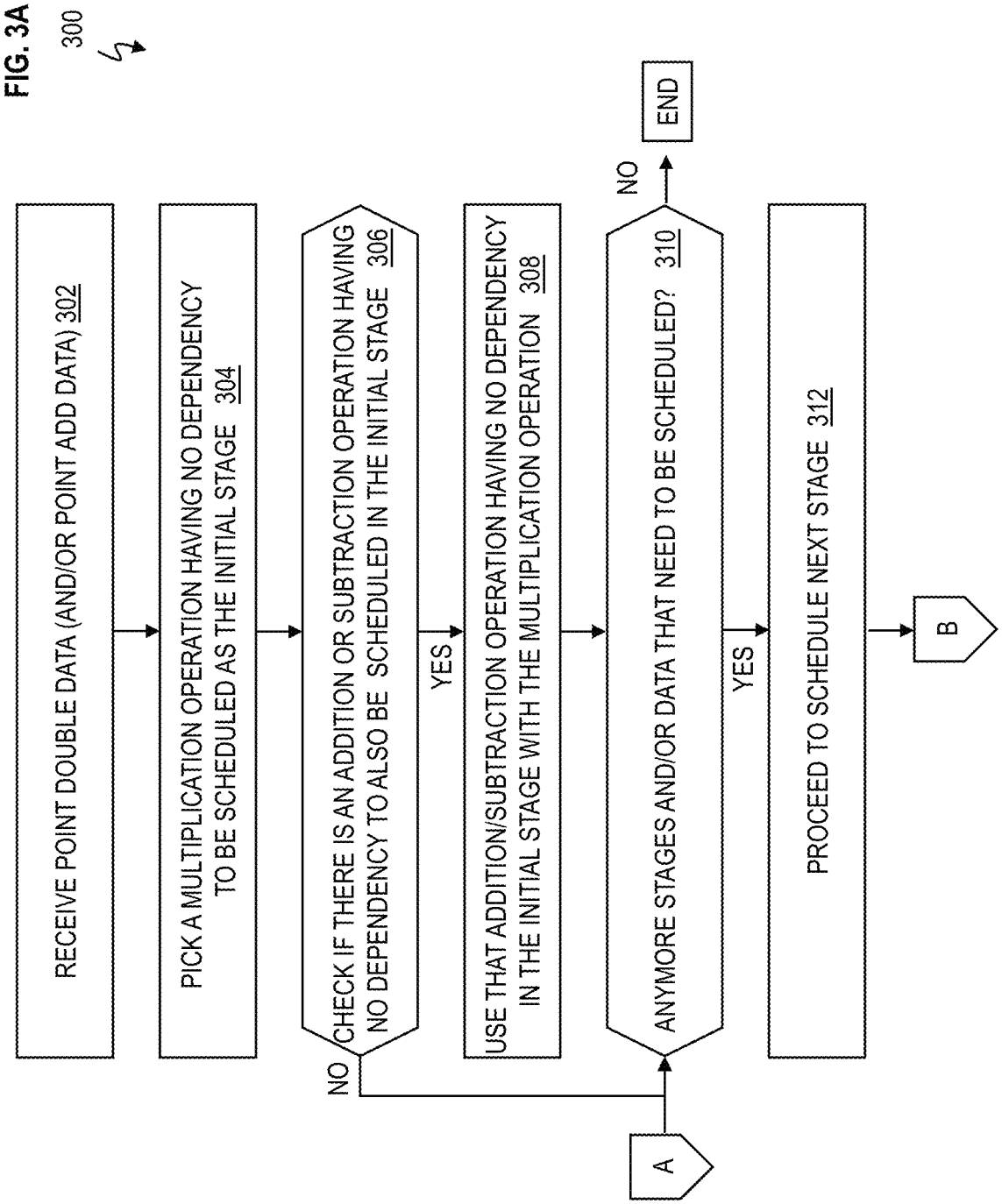

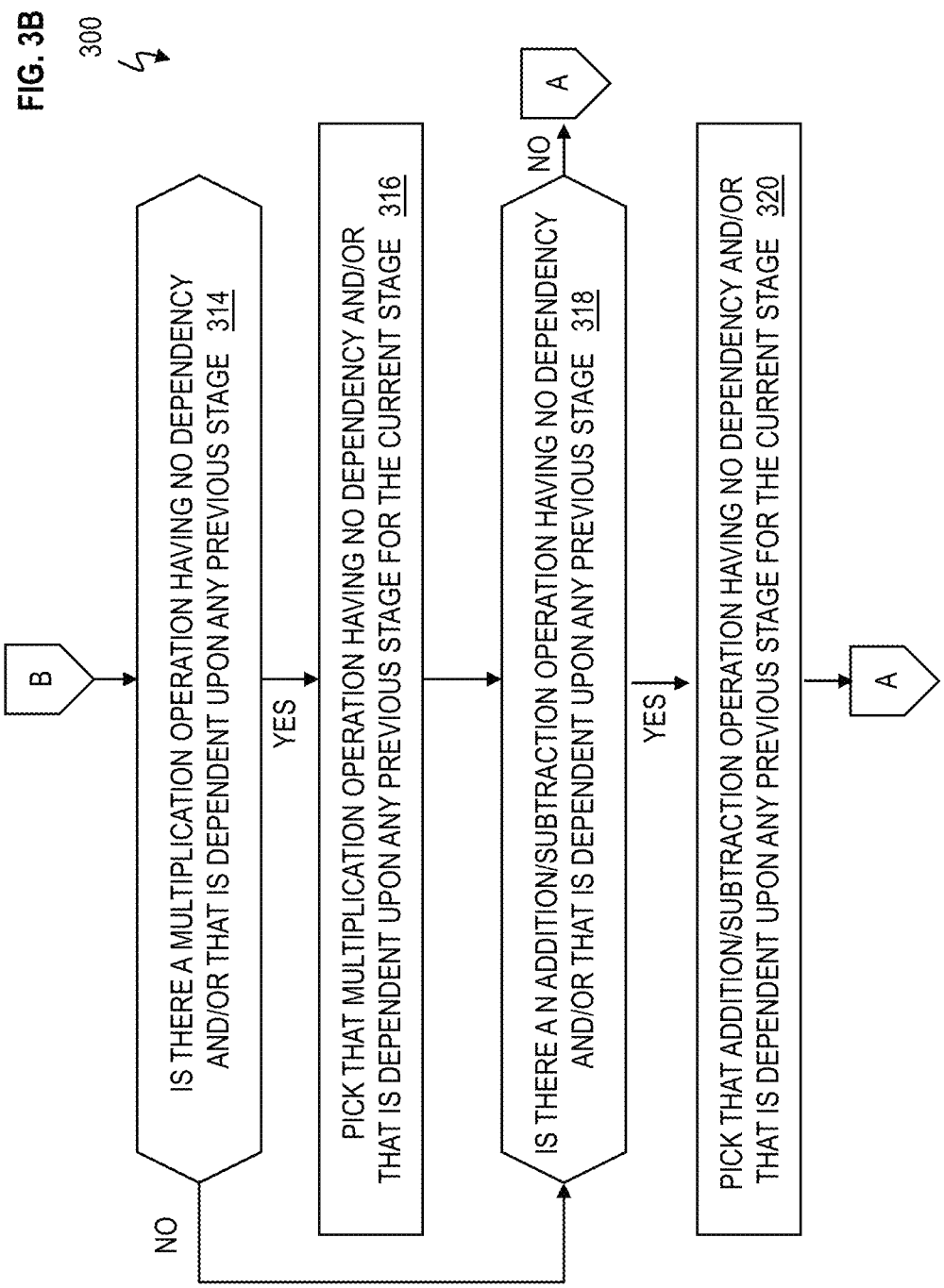

POINT DOUBLE SCHEDULE 400

POINT ADD SCHEDULE 500

POINT DOUBLE OPERATION
4 MULTIPLICATION STAGES + 8 ADDITION STAGES

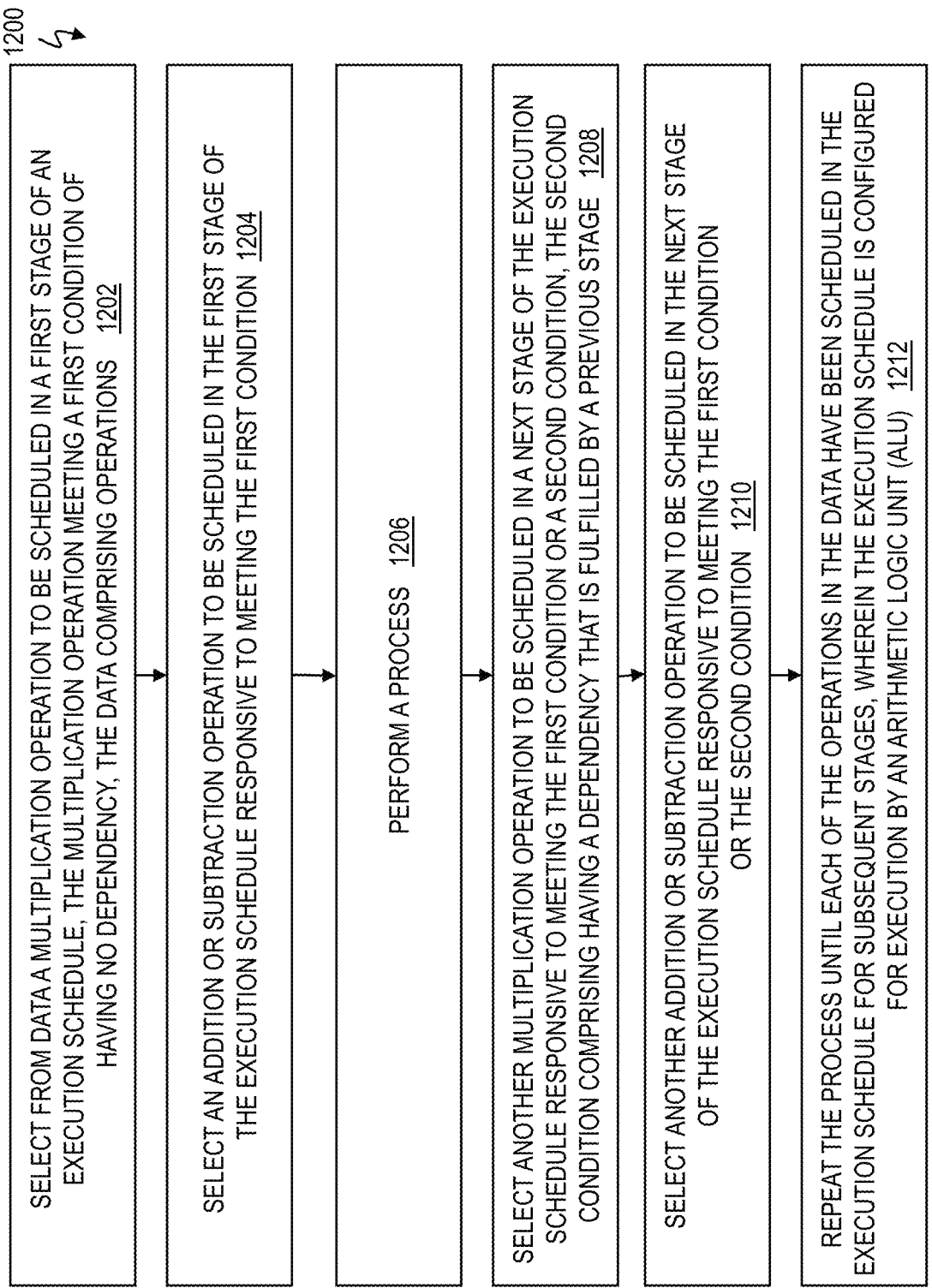

SCHEDULING ATOMIC FIELD OPERATIONS IN JACOBIAN COORDINATES USED IN ELLIPTIC CURVE CRYPTOGRAPHY SCALAR MULTIPLICATIONS

BACKGROUND

The present invention generally relates to computer systems, and more specifically, to computer-implemented methods, computer systems, and computer program products configured and arranged for scheduling atomic field operations in Jacobian coordinates used in elliptic curve cryptography scalar multiplications over, for example, short Weierstrass elliptic curves.

Elliptic curve cryptography (ECC) is an approach to public-key cryptography based on the algebraic structure of elliptic curves over finite fields. ECC allows smaller keys compared to non-EC cryptography (based on plain Galois fields) to provide equivalent security. In mathematics, a finite field or Galois field is a field that contains a finite number of elements. As with any field, a finite field is a set on which the operations of multiplication, addition, subtraction, and division are defined and satisfy certain basic rules. The most common examples of finite fields are given by the integers mod p when p is a prime number. Elliptic curves are applicable for key agreement, digital signatures, pseudo-random generators, and other tasks. Indirectly, they can be used for encryption by combining the key agreement with a symmetric encryption scheme.

SUMMARY

Embodiments of the present invention are directed to computer-implemented methods for scheduling atomic field operations in Jacobian coordinates used in elliptic curve cryptography scalar multiplications over, for example, short Weierstrass elliptic curves. A non-limiting example computer-implemented method includes selecting from data a multiplication operation to be scheduled in a first stage of an execution schedule, the multiplication operation meeting a first condition of having no dependency, the data including operations. The computer-implemented method includes selecting a mathematical operation to be scheduled in the first stage of the execution schedule responsive to the mathematical operation meeting the first condition, where the mathematical operation is for addition responsive to including an addition operator, where the mathematical operation is for subtraction responsive to including a subtraction operator. The computer-implemented method includes performing a process. The process includes selecting another multiplication operation to be scheduled in a next stage of the execution schedule responsive to the another multiplication operation meeting a condition of a plurality of conditions, the plurality of conditions including the first condition and a second condition, the second condition including having a dependency that is fulfilled by a previous stage. The process includes selecting another mathematical operation to be scheduled in the next stage of the execution schedule responsive to the another mathematical operation meeting the condition, and repeating the process until each of the operations in the data have been scheduled in the execution schedule for subsequent stages, where the execution schedule is configured for execution by an arithmetic logic unit (ALU).

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 3A and 3B together depict a flowchart of a computer-implemented process for scheduling atomic field operations in Jacobian coordinates used in elliptic curve cryptography scalar multiplications over elliptic curves in accordance with one or more embodiments of the present invention;

FIG. 12 depicts a flowchart of a computer-implemented process for scheduling and executing atomic field operations in Jacobian coordinates used in elliptic curve cryptography scalar multiplications over elliptic curves in accordance with one or more embodiments of the invention;

DETAILED DESCRIPTION

Figure 1:
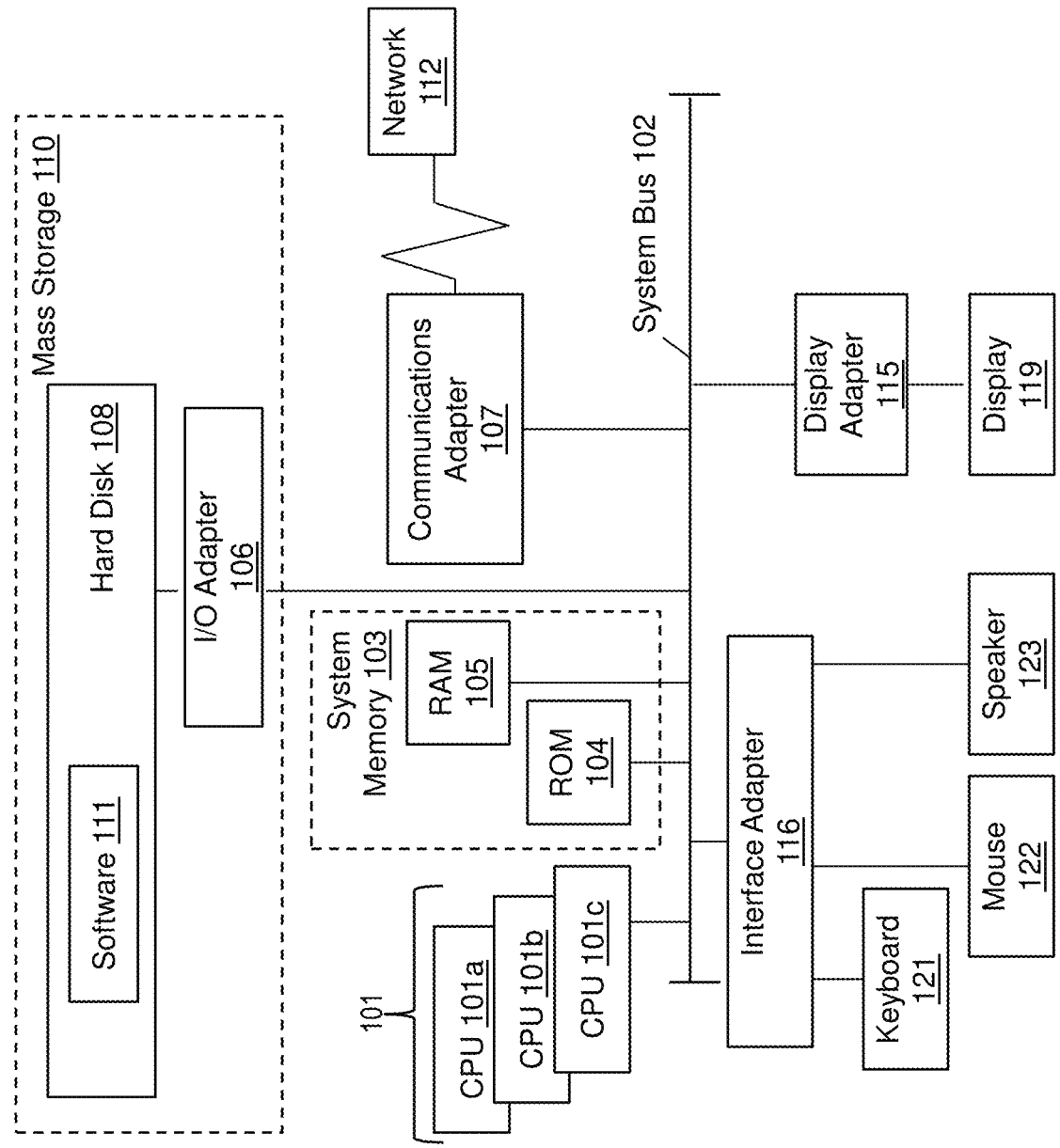
FIG. 1 depicts a block diagram of an example computer system for use in conjunction with one or more embodiments of the present invention.

One or more embodiments of the present invention provide computer-implemented methods, computer systems, and computer program products arranged and configured to provide scheduling of atomic field operations in Jacobian coordinates used in elliptic curve cryptography scalar multiplications over elliptic curves, such as, for example, short Weierstrass elliptic curves. Elliptic curve cryptography involves scalar multiplication performed in a finite field. The scalar multiplication operation involves point doubling and point addition. Each of these two point operations is achieved using underlying finite field arithmetic, namely addition, subtraction, multiplication, and inversion. Typically, the point operations are performed in Jacobian coordinates so that only a single field inverse operation is required. One or more embodiments of the invention address the scheduling of the finite field operations, such as the addition (add) operation, subtraction (sub) operation, multiplication (mul) operation, etc., used in the point double operation and point add operation performed in Jacobian coordinates, thereby making the processing of the finite field operations faster and more efficient.

Further, one or more embodiments of the invention provides an algorithm to perform point double and/or point add on a single arithmetic unit by scheduling the field multiply and field addition/subtraction operations to effectively achieve minimum execution time by an arithmetic unit, thereby improving the functioning of a computer system itself. Arithmetic units are usually located in processors and/or close to processors in a computer system. Any efficiency (i.e., faster execution time, fewer clock cycles, etc.) generated by the manner in which operations are processed by arithmetic units improve the functioning of a computer system, and provides the computer system with more time for other functions, instructions, etc. The algorithm applies to any modular arithmetic unit capable of multiplication operations, addition and subtraction operations, and modular reduction operations, and the algorithm schedules/arranges for execution these operations (e.g., multiplication, addition/subtraction, and modular reduction operations) in such a way that an add/sub operation followed by modular reduction takes less time than a multiplication operation. In addition to the execution time improvement of the arithmetic unit, the algorithm also requires fewer storage elements. For example, only 2 scratchpad storage elements are required for both point add and point double operations. According to one or more embodiments, the algorithm can be implemented in application specific integrated circuits (ASICs), field programmable gate arrays (FPGAs), other hardware, software, and/or a combination thereof. In one or more embodiments, an implementation can have, for example, the operands X2, Y2 be moved from array storage to flip-flop/latch storage. The benefit is that these operands are not affected throughout a scalar multiplication operation and the routing path from these elements (e.g., using the operands) can be ignored in timing analysis. This eases routing especially because the size of the operand buses is high for the National Institute of Standards and Technology (NIST) recommended elliptic curves. Effectively, the storage requirement is now brought down to 8 elements, for example, 3 input coordinates, 3 output coordinates, 2 temporary scratchpad elements. This allows a compact implementation using 3 address bits for the array storage instead of 4 required by other schemes.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
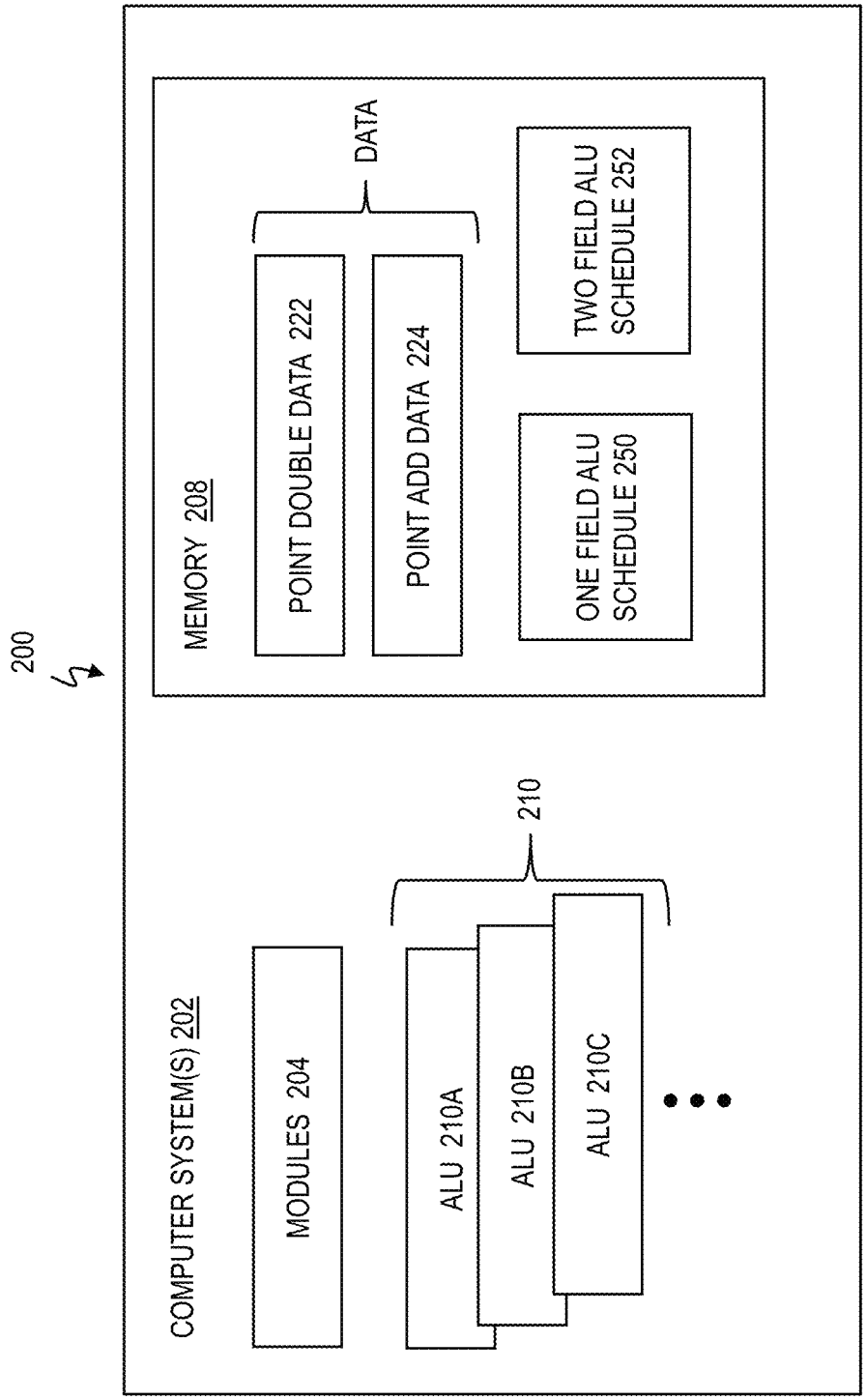
FIG. 2 depicts a block diagram of a system for scheduling atomic field operations in Jacobian coordinates used in elliptic curve cryptography scalar multiplications over elliptic curves in accordance with one or more embodiments of the present invention.

FIG. 2 is a block diagram of a system 200 for scheduling atomic field operations in Jacobian coordinates used in elliptic curve cryptography scalar multiplications over elliptic curves in accordance with one or more embodiments of the present invention. System 200 includes one or more computer systems 202. Computer system 202 can include any elements and functions of computer system 100 discussed in FIG. 1. Computer system 202 can include one or more modules 204 which are configured to perform the scheduling of the finite field operations, such as the addition (add) operation, subtraction (sub) operation, multiplication (mul) operation, etc., used in the point double operation and point add operation performed in Jacobian coordinates, as well as cause the operation of arithmetic logic units (ALUs). Module 204 implements and/or executes one or more algorithms (e.g., depicted in FIGS. 3A and 3B) that cause point double and point add to be performed on a single arithmetic unit by scheduling the field multiply and field addition/subtraction operations to achieve a minimum execution time. In one or more embodiments, module 204 implements and/or executes one or more algorithms (e.g., depicted in FIG. 8) that cause point double and point add to be performed on two arithmetic units by scheduling the field multiply and field addition/subtraction operations to achieve a minimum execution time.

Computer system 202 includes ALUs 210, which are illustrated as individual/single ALU 210A, ALU 210B, ALU 210C, and so forth. Each individual ALU 210A, ALU 210B, ALU 210C is a single arithmetic unit. An ALU is a combinational digital circuit that performs arithmetic and bitwise operations on integer binary numbers. As noted herein, the algorithms cause execution on any modular arithmetic unit capable of multiplication, addition/subtraction, and modular reduction operations, and the algorithm causes these operations (e.g., multiplication, addition/subtraction, and modular reduction operations) to be processed in such a way that an add/sub operation followed by modular reduction takes less time than a multiplication operation (alone).

Modules 204 described in FIG. 1 can be implemented as instructions stored on a computer-readable storage medium, as hardware modules, as special-purpose hardware (e.g., application specific hardware, application specific integrated circuits (ASICs), as embedded controllers, hardwired circuitry, etc.), and/or as some combination or combinations of these. In examples, modules described herein can be a combination of hardware and programming. The programming can be processor executable instructions stored on a tangible memory, and the hardware can include processing circuitry (e.g., processors 101) for executing those instructions. Thus, a system memory can store program instructions that when executed by processing circuitry implement the modules described herein. For example, the executable instructions can be implemented as software 111 executed on one or more processors 101, as discussed in FIG. 1. Elements of computer system 100 can be used in and/or integrated into computer system 202 in accordance with one or more embodiments of the invention. Other modules can also be utilized to include other features and functionality described in other examples herein. Alternatively or additionally, modules can include dedicated hardware, such as one or more integrated circuits, application specific integrated circuits (ASICs), application specific special processors (ASSPs), field programmable gate arrays (FPGAs), or any combination of the foregoing examples of dedicated hardware, for performing the techniques described herein.

FIGS. 3A and 3B together depict a flowchart of a computer-implemented process 300 (e.g., as the algorithm) for scheduling atomic field operations in Jacobian coordinates used in elliptic curve cryptography scalar multiplications over elliptic curves in accordance with one or more embodiments of the present invention. Atomic field operations are operations/instructions that are completed together. Moreover, computer-implemented process 300 is configured to provide area, time cross-optimal scheduling of elliptic curve cryptography field arithmetic operations in point add and point double in projective coordinates. The computer-implemented process 300 in FIGS. 3A and 3B can be implemented using system 200 shown in FIG. 2. Accordingly, the computer-implemented process 300 will now be described with reference to system 200.

At block 302, module 204 of computer system 202 is configured to receive data that needs to be scheduled for processing by a single ALU 210. For explanation purposes, a single ALU 210A is utilized for the scheduling discussed in the computer-implemented process 300. The data being processed can be point double data 222 or point add data 224 stored in and/or read from memory 208. The data comprises operations that are to be performed on ALU 210A. Example operations to be scheduled include addition (add) operations, subtraction (sub) operations, multiplication (mul) operations, etc., which may be scheduled in one field ALU schedule 250. For explanation purposes, point double data 222 may be utilized in example scenarios, and it should be understood that this description analogously applies to point add data 224. Further, for the data, which can be point double data 222 or point add data 224, the same 3 coordinates are loaded into the ALU to either perform a point-double or a point-add, usually both one after another. The output 3 coordinates from the point-double and/or point-add operation are again operated on to perform another point-double or point-add.

Figure 4:
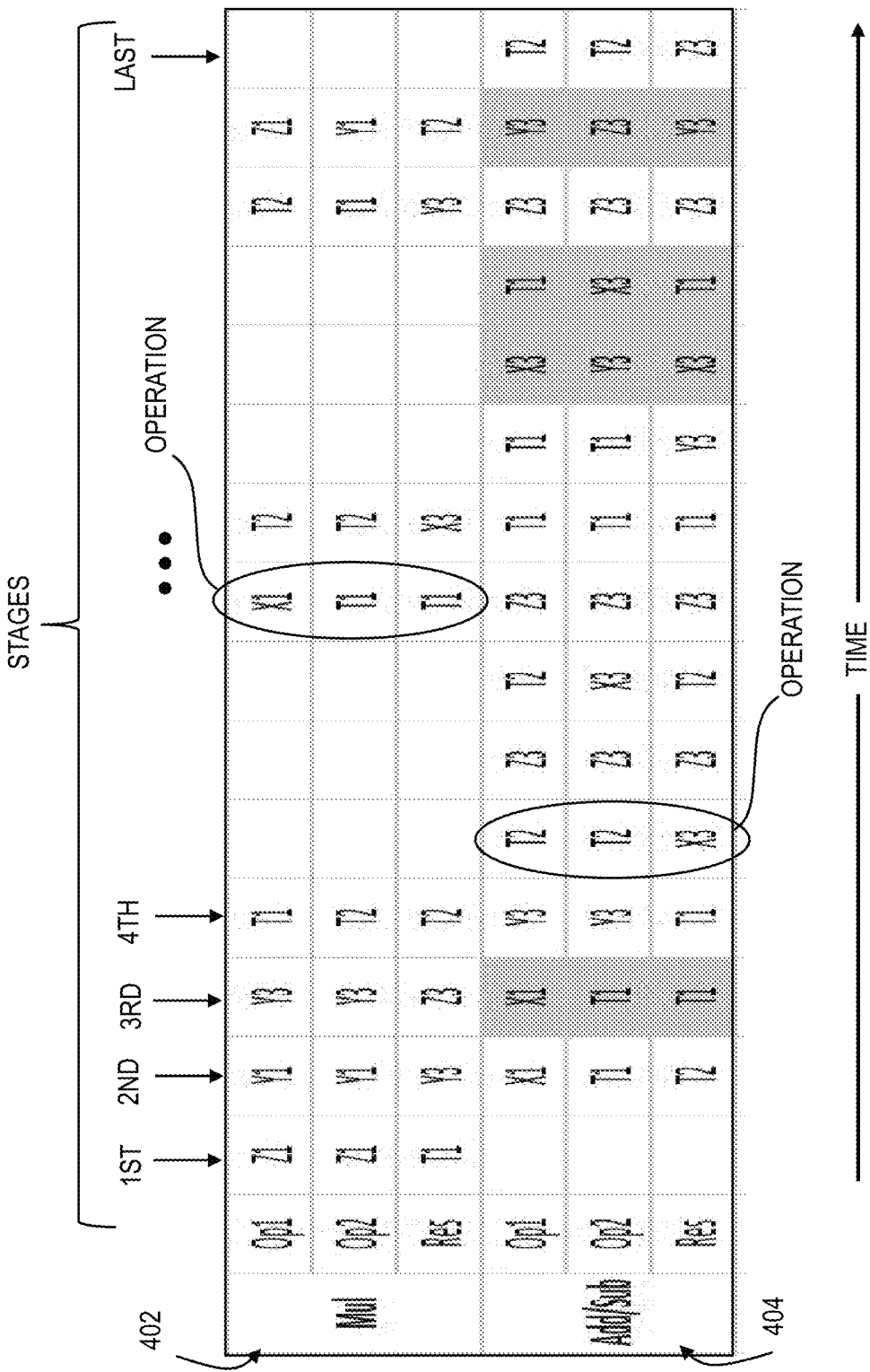
FIG. 4 depicts an example execution schedule in accordance with one or more embodiments of the present invention.

At block 304, module 204 is configured to select a multiplication operation having no dependency to other operations (e.g., as a first condition) in point double data 222 in order to schedule the selected multiplication operation in the initial stage. Module 204 can parse all operands of the operations (including addition (add) operations, subtraction (sub) operations, multiplication (mul) operations) in point double data 222 to find any multiplication operations that are not dependent upon a result (Res) of another operation (e.g., first condition). Module 204 selects this independent multiplication operation to schedule or insert in the initial stage. The initial stage is the first stage in a schedule of operations such as in one field ALU schedule 250, where the scheduled has numerous stages occurring in time. Operations in one field ALU schedule 250 are execution by (only) one field ALU, such as example ALU 210A. FIG. 4 depicts an example point double schedule 400 for the point double data 222 to be processed by a single ALU 210, for example, ALU 210A, in accordance with one or more embodiments. Point double schedule 400 as well as point add schedule 500 are examples of one field ALU schedules 250. Point double schedule 400 is depicted as a table having columns and rows. Point double schedule 400 includes a first block 402 of rows denoting multiplication operations and a second block 404 of rows denoting addition and subtraction operations for execution. The gray shading denotes a subtraction operation in the second block 404. First block 402 corresponds to a multiplication block in ALU 210A and comprises an ordering of multiplication operations that are executed by the multiplication block in ALU 210A, while second block 404 corresponds to an addition/subtraction block in ALU 210A and comprises an ordering of addition/subtraction operations that are executed by the addition/subtraction block in ALU 210A. Each block, first block 402 and second block 404, has a row for operand 1 (Op1) and operand 2 (Op2) and the result (Res) of the operation on operands 1 and 2. An operation has its operands and result in the same column within the same block, such as in first block 402 and/or in second block 404. The combination of operands 1 and 2 according to their mathematical operation is considered an operation. As noted above, module 204 parses the operands of the operations in the data, for example, point double data 222 to find operands (e.g., Op 1 and Op2) that are not dependent on having a result (Res) from another operation (i.e., the first condition is met). In order to determine dependency, module 204 can perform a comparison of each operand in a given operation to the results of other operations in order to determine if a result of any other operation is needed and/or matches the operand for the given operation. If there is a match which means that the given operation has an operand (e.g., operand 1, operand 2, and/or both) that is dependent upon the result of another operation, the given operation cannot be the initial operation in the first/initial stage and that operation would have to be scheduled after any operation that the given operation is dependent upon (i.e., the first condition is not met). When a given operation is found that does not require a result of any other operation (i.e., no dependency), module 204 is configured to select and schedule this given operation as the first stage or initial stage in the execution schedule (i.e., the first condition is met). In this example scenario, module 204 has selected a multiplication operation for the first block 402 in the first stage which is the first column in point double schedule 400. Accordingly, module 204 is configured to insert/select in the first/initial stage input operand Z1 times input operand Z1 which equals the result T1 (i.e., Z1*Z1=T1), as a multiplication operation to fill the first stage of the first block 402.

At block 306, module 204 is configured to check (e.g., the first condition) if there is an addition or subtraction operation that has no dependency on any other operations in point double data 222 in order to schedule the addition/subtraction operation in the first/initial stage along with the multiplication operation that has been scheduled. For example, module 204 can parse all operands of the addition operations and subtraction operations in point double data 222 to find any addition/subtraction operation that is not dependent (i.e., does not have an operand that is reliant) upon a result (Res) of another operation including the selected multiplication operation in block 304.

At block 308, if module 204 determines that there is a given addition/subtraction operation having no dependency, module 204 selects this independent addition/subtraction operation to schedule or insert in the first/initial stage. In this example, the given addition/subtraction operation is to be inserted in second block 404 in the first stage (not shown in FIG. 4). If module 204 determines that there is no addition/subtraction operation having no dependency (i.e., all the addition/subtraction operations have an operand that is dependent upon the result of another operation (which could be a multiplication operation and/or addition/subtraction)) (i.e., first condition not met), flow proceeds to block 310. Accordingly, FIG. 4 shows the case in which second block 404 has no addition/subtraction operation in the first stage because all the addition/subtraction operations have an operand that is dependent upon the result of another operation, and therefore no addition/subtraction operation is scheduled in the first stage in second block 404 in this example scenario.

At block 310, module 204 is configured to check if there are any more stages in the execution schedule that need to be filled/scheduled and/or check if there are any more operations (data) that have not been scheduled for processing. If all stages are filled/scheduled and/or if all operations are scheduled, the flow ends. If there are stages and/or operations that need to be filled/scheduled, module 204 is configured to proceed with scheduling the next stage with operations at block 312. For example, the module 204 can move to the next memory address which is a memory location (e.g., in memory 208) that needs to be filed operations. The next stage to be filled with operations becomes the current stage.

At block 314, module 204 is configured to check if there is a multiplication operation having no dependency to other operations (e.g., first condition) and/or that is dependent upon any previously scheduled stage (e.g., second condition), more particularly, dependent upon any previously scheduled operation in a previous stage. Selecting an operation that is dependent upon any previously scheduled operation in a previous stage means that a value of the result from the previously scheduled operation is available to be utilized in an operand of the currently selected/scheduled operation. If so, module 204 is configured to select/insert that multiplication operation, which has no dependency (e.g., first condition) and/or that is dependent upon any previous stage (e.g., second condition), for the current stage at block 316. In the example scenario depicted in FIG. 4, the multiplication operation of Y1*Y1=Y3 is selected and inserted in the second stage in first block 402 because it meets the conditions (i.e., it meets the first and second conditions, although meeting either would have been sufficient). If a multiplication operation cannot be found that has no dependency and/or that is dependent upon any previously scheduled operation in a previous stage, flow proceeds to block 318.

At block 318, module 204 checks if there is an addition/subtraction operation having no dependency to other operations (e.g., first condition) and/or that is dependent upon any previously scheduled stage (e.g., second condition), more particularly, dependent upon any previously scheduled operation in a previous stage. If so, module 204 is configured to select/insert that addition/subtraction operation, which has no dependency and/or that is dependent upon any previous stage, for the current stage at block 320. In the example scenario depicted in FIG. 4, the addition/subtraction operation of X1*T1=T2 is selected and inserted in the second stage in second block 404 because it meets the conditions (although meeting either the first or second condition would be sufficient). If an addition/subtraction operation cannot be found that has no dependency and/or that is dependent upon any previously scheduled operation in a previous stage, flow proceeds to block 310. The process continues until all operations have been scheduled in the data (e.g., point double data 222 or point add data 224). For example, the computer-implemented process 300 of module 204 continues to schedule operations as depicted in point double schedule 400 in FIG. 4. The scheduling in FIG. 4 is done to allow a field ALU to hide addition/subtraction operations with multiplication operations. Particularly, an addition/subtraction operation is scheduled in the same stage with a multiplication operation such that the addition/subtraction operation and the multiplication operation are concurrently processed/executed in the field ALU, for example, ALU 210A. This reduces execution time as opposed to having the multiplication operation and addition/subtraction operation be processed in sequence.

FIG. 4 is an elliptic curve cryptography implementation for field ALU that uses an efficient point double schedule 400. Point double schedule 400 uses 2 scratchpad storages, T1 and T2. T1 and T2 are memory locations that temporarily hold values during mathematical operations. Scratchpad memory, also known as scratchpad, scratchpad RAM, and/or local store in computer terminology, is a high-speed internal memory used for temporary storage of calculations, data, and other work in progress. In a processor ("CPU"), scratchpad refers to a special high-speed memory circuit used to hold small items of data for rapid retrieval. In one or more embodiments, the scratchpad storage may be an L1 cache although further from the ALU. In one or more embodiments, scratchpad storage may be processor registers. In FIG. 4, the first stage, second stage, third stage, through the last stage denote a time of execution, such that the operations in the first stage are sent to the ALU for processing (and begin processing) before the second stage, and so forth. FIG. 4 illustrates that there are 8 multiplication operations and 7 addition/subtraction operations that are not in a concurrent stage with a multiplication operation. In other words, 7 addition/subtraction operations are independent and not hidden with a multiplication operation.

Figure 5:
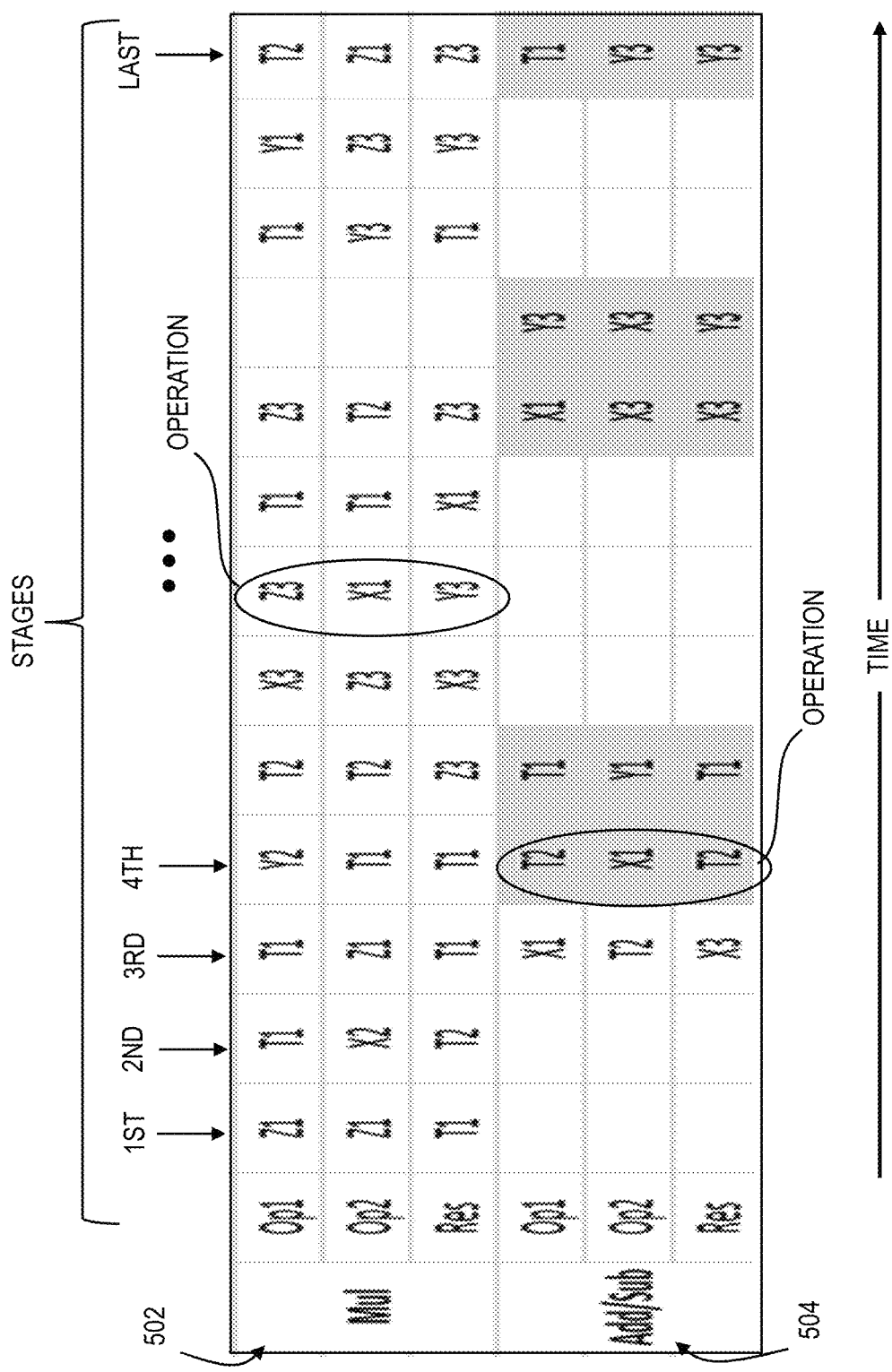
FIG. 5 depicts an example execution schedule in accordance with one or more embodiments of the present invention.

FIG. 5 depicts an example point add schedule 500 for the point add data 224 to be processed by a single ALU 210, for example, ALU 210A, in accordance with one or more embodiments. Module 204 schedules and/or inserts operations in stages as discussed above with reference to FIG. 4. In FIG. 5, point add schedule 500 is depicted as a table having columns and rows. Point add schedule 500 includes a first block 502 of rows denoting multiplication operations and a second block 504 of rows denoting addition and subtraction operations. The gray denotes a subtraction operation in the second block 504. First block 502 corresponds to a multiplication block in ALU 210A and comprises an ordering of multiplication operations that are executed by the multiplication block in ALU 210A while second block 504 corresponds to an addition/subtraction block in ALU 210A and comprises an ordering of addition/subtraction operations that are executed by the addition/subtraction block in ALU 210A. Each block, first block 502 and second block 504, has a row for operand 1 (Op1) and operand 2 (Op2) and the result (Res) of the operation on operands 1 and 2. An operation has its operands and result in the same column within the same block, such as in first block 502 and/or in second block 504. The combination of operands 1 and 2 according to their mathematical operation is considered an operation. FIG. 5 illustrates 12 multiplication operations in total and 1 addition/subtraction operations that are not in a concurrent stage with a multiplication operation for concurrent processing by the field ALU. In other words, 1 addition/subtraction operation is independent and not hidden with a multiplication operation. The example scheduling shown in FIGS. 4 and 5 use minimal temporary registers (i.e., scratchpads) and achieve the fastest field multiplication.

Figure 6:
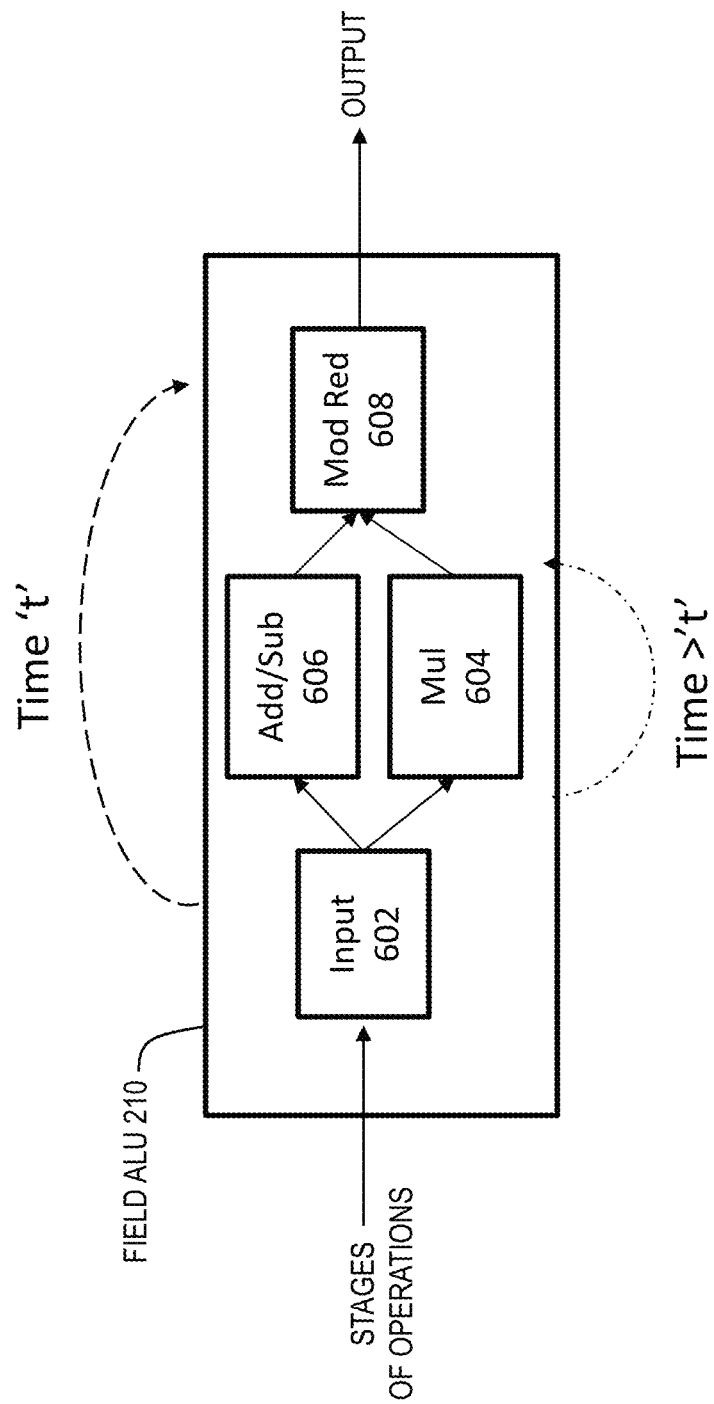
FIG. 6 depicts a block diagram of an example field ALU in accordance with one or more embodiments of the present invention.

FIG. 6 depicts a block diagram of an example field ALU according to one or more embodiments of the invention. For example, the field ALU can be an individual ALU 210. ALU 210 can include an input block 602, a multiplication block 604, an addition and subtraction block 606, and a modular reduction block 608. Input block 602, multiplication block 604, addition/subtraction block 606, and modular reduction block 608 are each formed of combination logic to perform and function accordingly. Addition/subtraction block 606 is configured to perform both addition and subtraction operations. As can be seen, multiplication block 604 and addition/subtraction block 606 are in parallel within the single ALU 210. The time 't' to perform addition/subtraction 606 is less than the time to perform multiplication block 604. Moreover, the time T to perform the addition/subtraction block 606 and module reduction block 608 is less than the time to perform multiplication block 604. As such, module 204 is designed to schedule an addition/subtraction operation to be input concurrently with a multiplication operation to input block 602, such that both operations can be performed concurrently by addition/subtraction block 606 and multiplication block 604, respectively. When pairing the addition/ subtraction operation with a multiplication operation in the same stage, module 204 confirms that the addition/subtraction operation does not have an operand that requires a subsequent operation (i.e., a result) in a subsequent stage in the scheduling. Input block 602 is configured to recognize multiplication operations and direct them to multiplication block 604. Likewise, input block recognizes addition/subtraction operations and directs them to addition/subtraction block 606. Addition/subtraction block 606 performs the addition or subtraction operation, while multiplication block 604 performs the multiplication operation. Modular reduction block 608 is configured to reduce a number modulo "a" fixed prime using any of the known techniques, as understood by one having ordinary skill in the art. For example, it could perform this via addition/subtractions if the prime satisfies the special condition of a pseudo-Mersenne prime; or it could perform Barrett or Montgomery modular reduction. The output of the modular reduction block 608 is the result of a modular multiplication of two operands or the modular addition or subtraction of two operands and is a number less than the prime.

Figure 7:
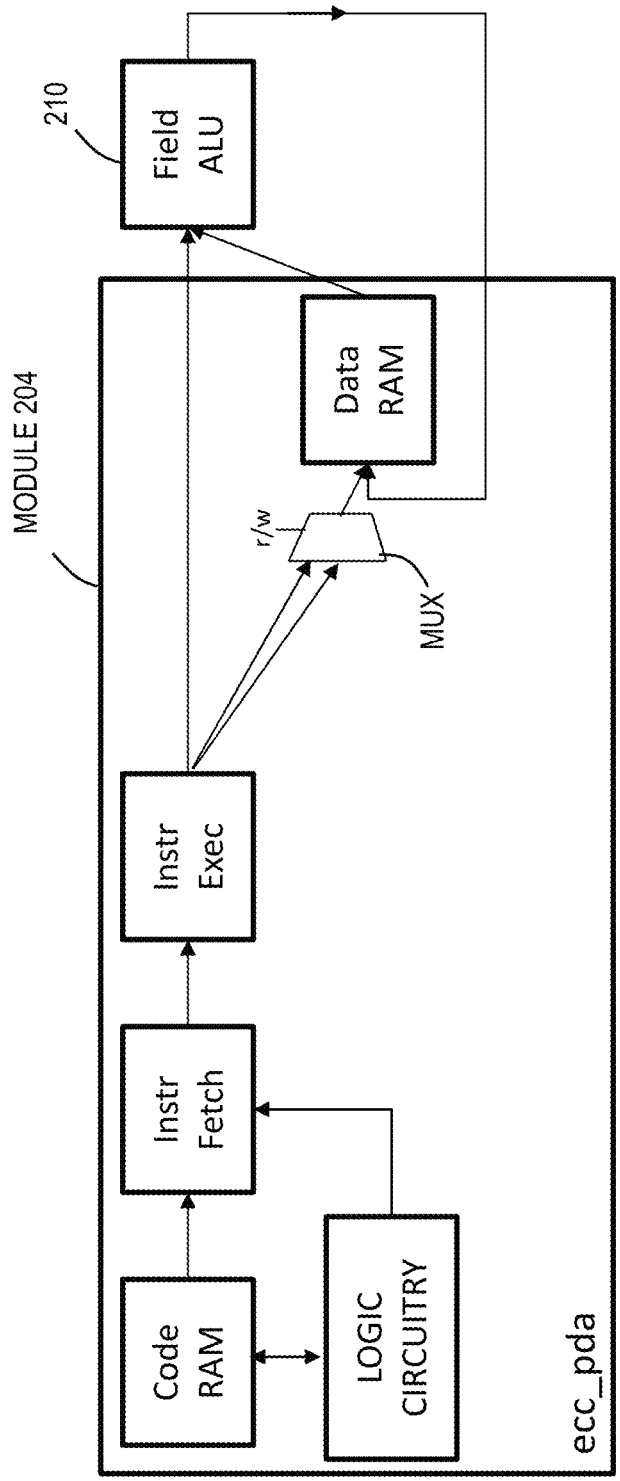
FIG. 7 depicts a block diagram of an example module in accordance with one or more embodiments of the present invention.

FIG. 7 is a block diagram of an example module 204 in accordance with one or more embodiments of the invention. Logic circuitry is used to schedule operations (e.g., point double data 222 and/or point add data 224) to cause any addition/subtraction operation to be in the same stage and performed with a multiplication operation when there is no dependency needed by the addition/subtraction operation to a subsequent result/stage and/or the current result of the multiplication operation in the same stage, such that the time to execute the addition/subtraction operation is hidden in the time for executing the multiplication operation. Therefore, extra time to perform the addition/subtraction operation is not needed for any addition/subtraction operation in the same stage with a multiplication operation. Logic circuitry can arrange the data operations in code RAM at specific memory locations (memory addresses) and/or store the data operations after scheduling in code RAM. Examples of scheduled data/data operations are illustrated as point double schedule 400 and point add schedule 500. The operations are instructions for execution. Instruction fetch block is configured to fetch the next instruction (i.e., operation(s)) from the memory address that is currently stored in the code RAM. The instructions correspond to operations. The instructions can be arranged for automatic selection by the instruction fetch block according to the execution schedule, for example, according to an arranged block of memory addresses. Also, logic circuitry can direct the order in which the instruction fetch block is to fetch the appropriate instruction (i.e., operation(s)). An instruction execution block may interpret the instruction if needed, and this interpretation/decoding can be performed by a decoder (not shown). The instruction execution block is configured to pass instruction (e.g., operations), which may be decoded information as a sequence of control signals, to the field ALU to perform the actions required by the instruction, such as to perform mathematical or logic functions on them, and the result can be written back to a data RAM. A multiplexer can also receive the instruction (operations) from the instruction execution block. The instruction execution block sends four addresses to the data RAM. Two of those addresses are meant for the read operation which are the addresses of the two operands to be read out and fed to the arithmetic unit (i.e., the field ALU). The third address is intended for a write operation which is the address to write the result from the arithmetic unit (i.e., the field ALU). The fourth address is used only during initialization of the data RAM. Based on the three conditions which are read/write/initialization, the multiplexer (mux) chooses the addresses that needs to be fed to the data RAM. It should be appreciated that although an example module 204 is depicted in a particular configuration, module 204 is not limited to the exact configuration shown in FIG. 7. Module 204 may have more or fewer components.

Figure 8:
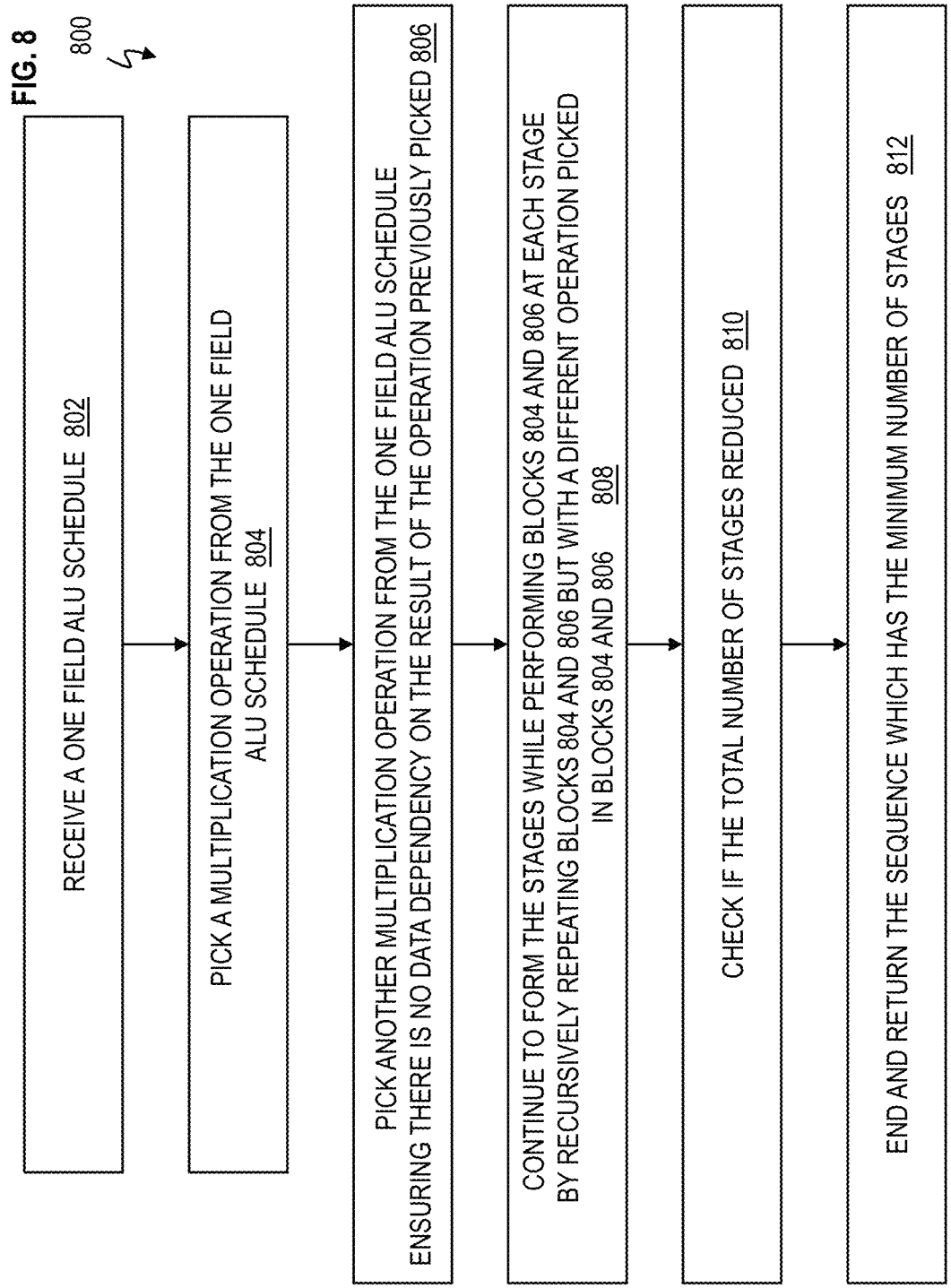
FIG. 8 depicts a flowchart of a computer-implemented process for scheduling atomic field operations in Jacobian coordinates used in elliptic curve cryptography scalar multiplications over elliptic curves in accordance with one or more embodiments of the present invention.

FIG. 8 depicts a flowchart of a computer-implemented process 800 (e.g., as the algorithm) for scheduling atomic field operations in Jacobian coordinates used in elliptic curve cryptography scalar multiplications over elliptic curves in accordance with one or more embodiments of the present invention. The computer-implemented process 800 in FIG. 8 can be implemented using system 200 shown in FIG. 2. Accordingly, the computer-implemented process 800 will now be described with reference to system 200. The computer-implemented process 800 can continue from the computer-implemented process 300 discussed above. The computer-implemented process 300 resulted in the one field ALU schedule 250 to be executed by (only) a single ALU, for example, ALU 210A. The computer-implemented process 800 results in a two field ALU schedule 252 to be executed by two field ALUs, for example, both ALU 210A and ALU 210B. In one or more embodiments, the two field ALU schedule 252 can be a modified one field ALU schedule 250 and/or enlarged one field ALU schedule 250. In one or more embodiments, the two field ALU schedule 252 can be a separate, independent memory structure from the one field ALU schedule 250. In either case, the computer-implemented process 800 is configured to provide time cross-optimal scheduling of elliptic curve cryptography field arithmetic operations in point add and point double in projective coordinates over two field ALUs.

At block 802, module 204 of computer system 202 is configured to receive a one field ALU schedule, for example, one field ALU schedule 250, structured to be processed by a single ALU, for example, ALU 210A. The one field ALU schedule includes operations designated in stages as discussed in FIGS. 3A and 3B.

At block 804, module 204 is configured to select a multiplication operation from the one field ALU schedule 250 as the first stage in the two field ALU schedule 252.

At block 806, module 204 is configured to select another multiplication operation from the one field ALU schedule 250 for the next stage while ensuring that there is no data dependency on the result of the multiple operation previously selected in block 804. Any operations selected from the one field ALU schedule 250 are deleted, after being placed in the two field ALU schedule 252.

At block 808, module 204 is configured to continue forming the remaining stages of the two field ALU schedule 250 by repeating blocks 804 and 806 at each stage by recursively repeating blocks 804 and 806 but with a different operation selected in blocks 804 and 806 for each subsequent stage.

At block 810, module 204 is configured to check if the total number of stages is reduced, where a single stage is defined as the set of all operations that can be performed simultaneously, i.e., in parallel. The block 810 counts the total number of stages in the schedule and keeps track of the minimum number of stages and the corresponding schedule. At block 812, module 204 is configured to end and return the sequence which has the minimum number of stages in the two field ALU schedule 252. Accordingly, module 204 is configured to cause two field ALUs, for example, ALU 210A and 210B to execute operations (i.e., multiplication operations and addition/subtraction operations) according to the stages in the two field ALU schedule 252.

Figure 9:
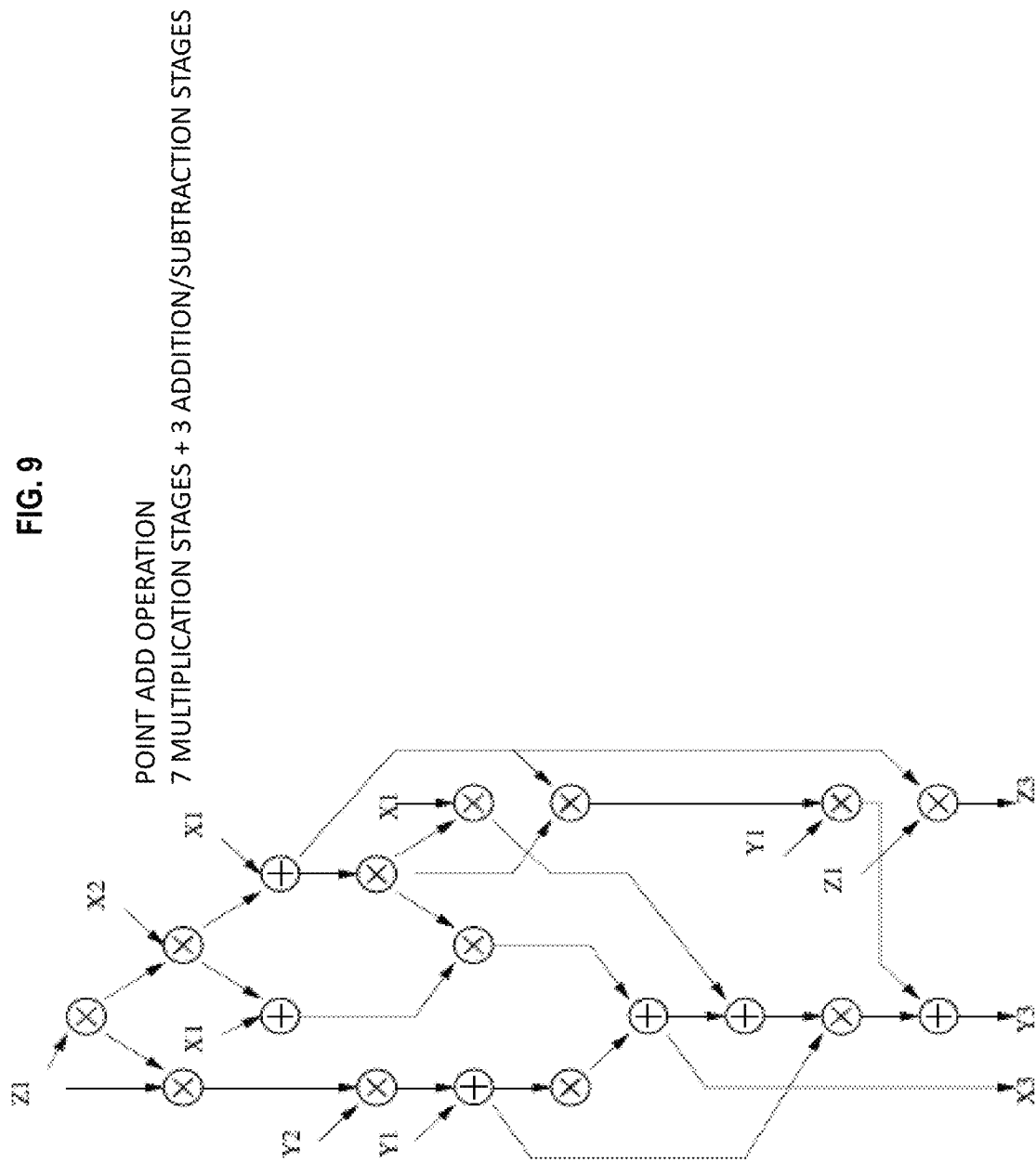
FIG. 9 is a diagram illustrating the flow of a point add operation for execution by two ALUs in accordance with one or more embodiments of the present invention.

FIG. 9 is a diagram showing the flow of a point add operation for execution by two ALUs, for example, ALUs 210A and 210B, in accordance with one or more embodiments. The point add operation includes 7 multiplication stages plus 3 addition/subtraction stages. The point add operations can be scheduled in the two field ALU schedule 252 as discussed herein.

Figure 10:
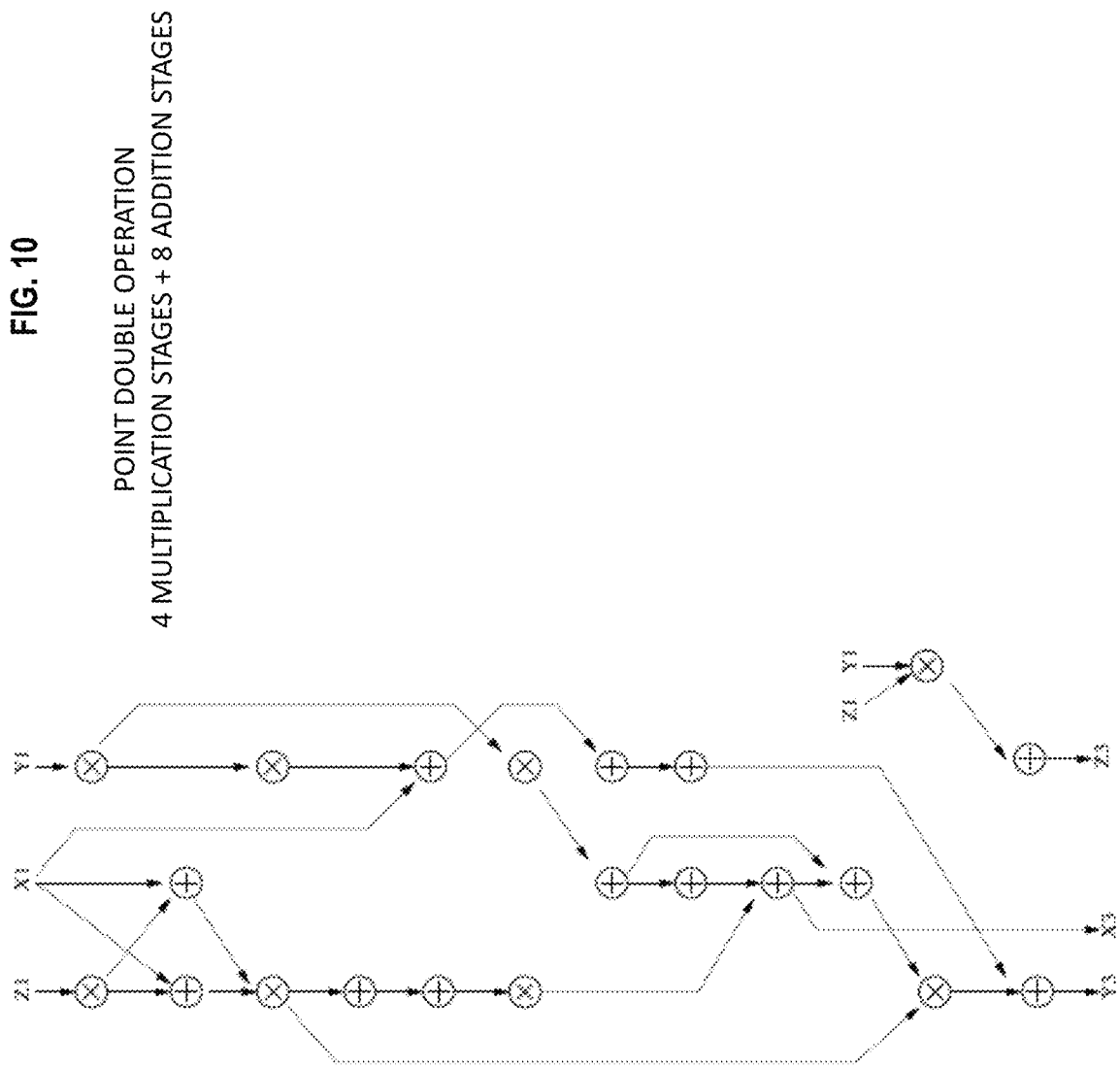
FIG. 10 is a diagram illustrating the flow of a point double operation for execution by two ALUs in accordance with one or more embodiments of the present invention.

FIG. 10 is a diagram showing the flow of a point double operation for execution by two ALUs, for example, ALUs 210A and 210B, in accordance with one or more embodiments. The point double operation includes 4 multiplication stages plus 4 addition/subtraction stages. The point double operations can be scheduled in the two field ALU schedule 252 as discussed herein.

Figure 11A:
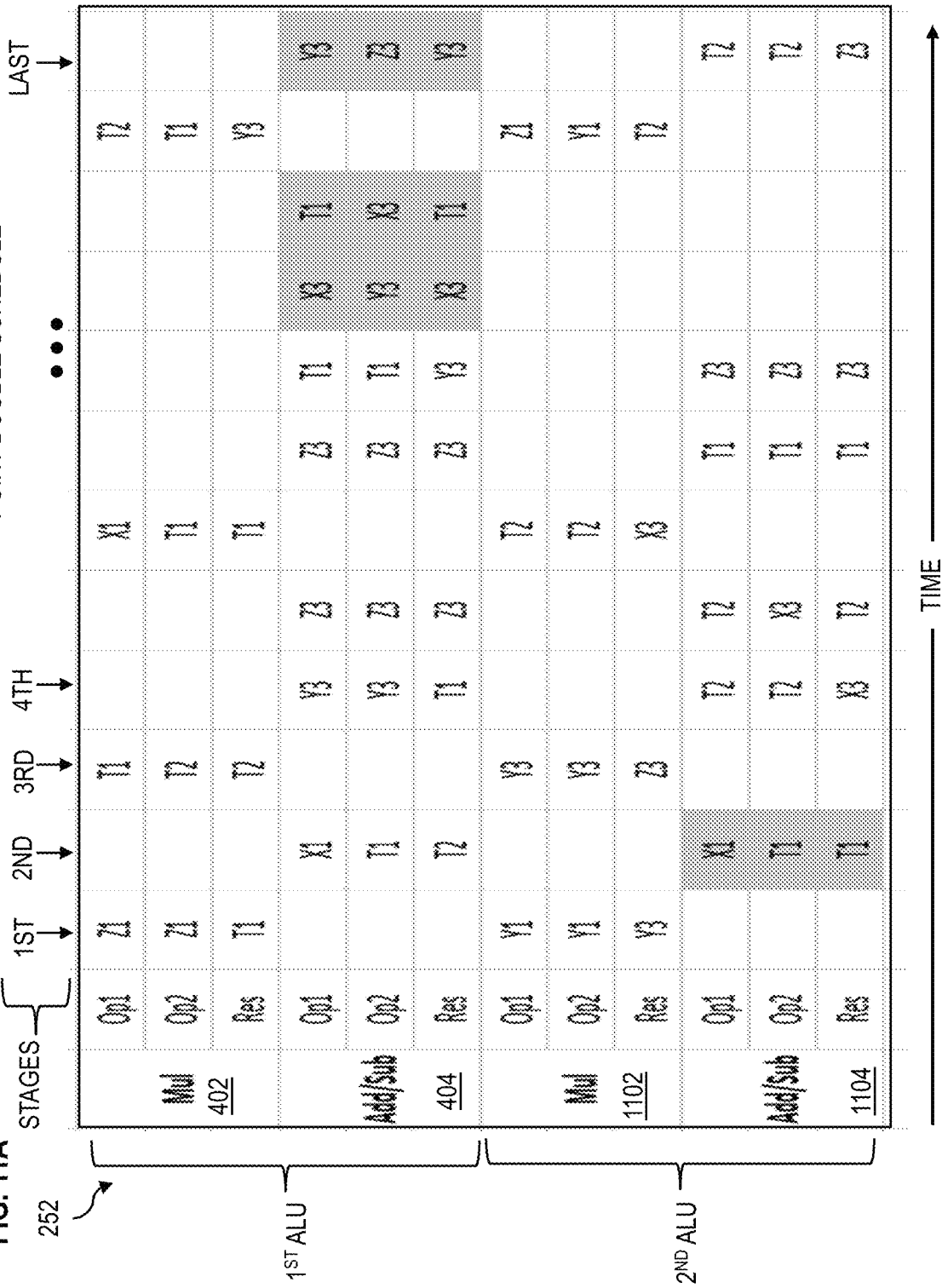
FIG. 11A depicts an example two field ALU schedule for operations processed/executed by two ALUs in accordance with one or more embodiments.
Figure 11B:
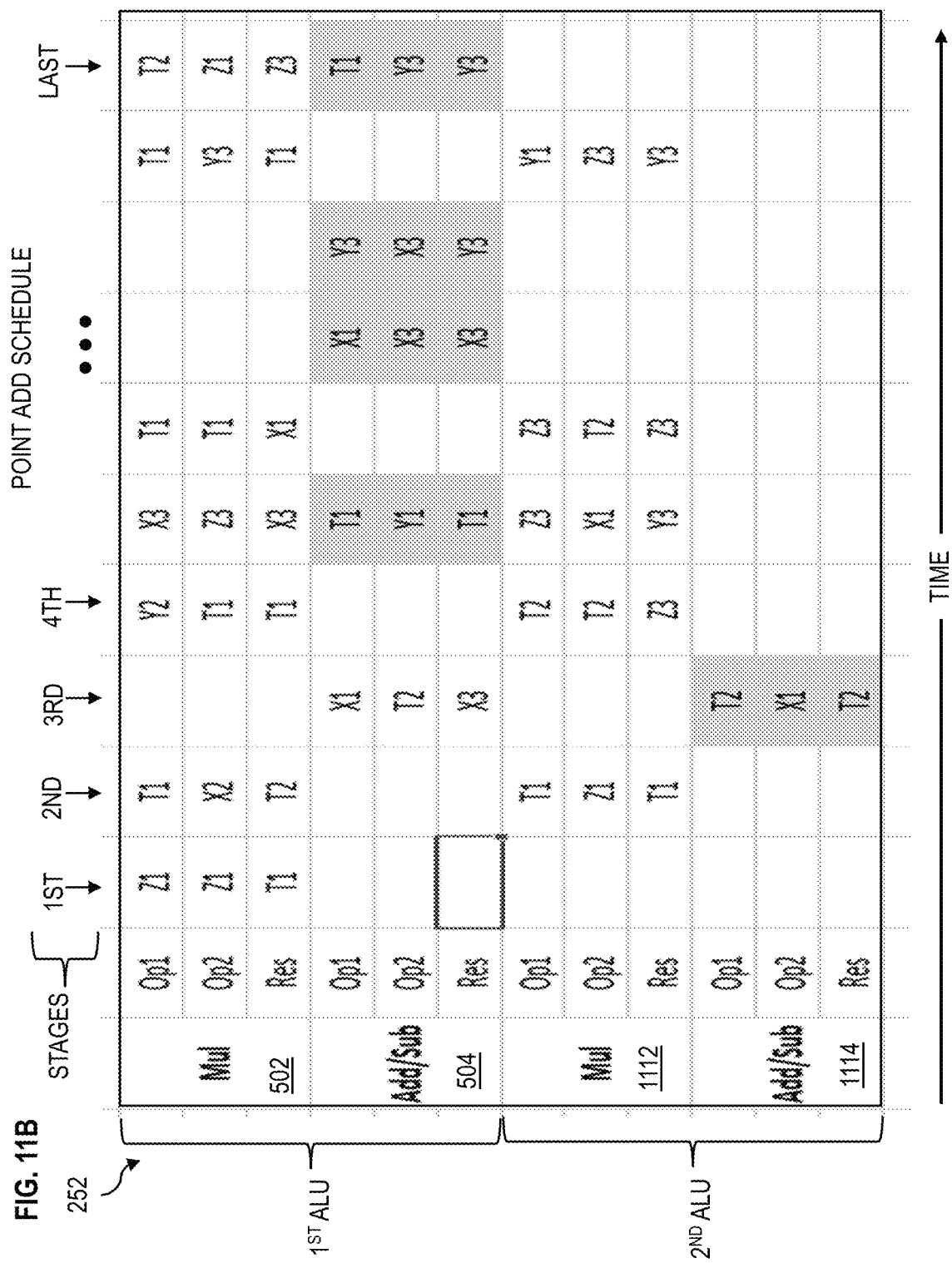
FIG. 11B depicts an example two field ALU schedule for operations processed/executed by two ALUs in accordance with one or more embodiments.

FIG. 11A depicts an example two field ALU schedule 252 for operations in the point double data 222 to be processed/executed by two ALUs 210, for example, ALU 210A and ALU 210B, in accordance with one or more embodiments. The two field ALU schedule 252 is depicted as a table having columns and rows. For execution by the first ALU, for example, ALU 210A, a first block 402 of rows denoting multiplication operations and a second block 404 of rows denoting addition and subtraction operations are illustrated. As discussed for a single field ALU, first block 402 corresponds to a multiplication block in ALU 210A and comprises an ordering of multiplication operations that are executed by the multiplication block in ALU 210A, while second block 404 corresponds to an addition/subtraction block in ALU 210A and comprises an ordering of addition/subtraction operations that are executed by the addition/subtraction block in ALU 210A. Each block, first block 402 and second block 404, has a row for operand 1 (Op1) and operand 2 (Op2) and the result (Res) of the operation on operands 1 and 2. Additionally, a third block 1102 corresponds to a multiplication block in ALU 210B and comprises an ordering of multiplication operations that are executed by the multiplication block in ALU 210B, while fourth block 1104 corresponds to an addition/subtraction block in ALU 210B and comprises an ordering of addition/subtraction operations that are executed by the addition/subtraction block in ALU 210B. Each block, third block 1102 and fourth block 1104, has a row for operand 1 (Op1) and operand 2 (Op2) and the result (Res) of the operation on operands 1 and 2. As noted herein, the combination of operands 1 and 2 according to their mathematical operation is considered an operation. Analogously, FIG. 11B depicts an example two field ALU schedule 252 for operations in the point add data 224 to be processed/executed by two ALUs 210, for example, ALU 210A and ALU 210B, in accordance with one or more embodiments. For execution by the first ALU, for example, ALU 210A, a first block 502 of rows denoting multiplication operations and a second block 504 of rows denoting addition and subtraction operations are illustrated. As discussed for a single field ALU, first block 502 corresponds to a multiplication block in ALU 210A and comprises an ordering of multiplication operations that are executed by the multiplication block in ALU 210A, while second block 504 corresponds to an addition/subtraction block in ALU 210A and comprises an ordering of addition/subtraction operations that are executed by the addition/subtraction block in ALU 210A. Each block, first block 502 and second block 504, has a row for operand 1 (Op1) and operand 2 (Op2) and the result (Res) of the operation on operands 1 and 2. Additionally, a third block 1112 corresponds to a multiplication block in ALU 210B and comprises an ordering of multiplication operations that are executed by the multiplication block in ALU 210B, while a fourth block 1114 corresponds to an addition/subtraction block in ALU 210B and comprises an ordering of addition/subtraction operations that are executed by the addition/subtraction block in ALU 210B. Each block, third block 1112 and fourth block 1114, has a row for operand 1 (Op1) and operand 2 (Op2) and the result (Res) of the operation on operands 1 and 2.

FIG. 12 is a flowchart of a computer-implemented process 1200 for scheduling and executing atomic field operations in Jacobian coordinates used in elliptic curve cryptography scalar multiplications over elliptic curves in accordance with one or more embodiments of the invention. The computer-implemented process 1200 in FIG. 12 can be implemented using system 200 shown in FIG. 2.

At block 1202, module 204 is configured to selecting from data (e.g., point double data, point add data, etc.) a multiplication operation to be scheduled in a first stage of an execution schedule (e.g., one field ALU schedule 250, two field ALU schedule 252), the multiplication operation meeting a first condition of having no dependency, the data comprising operations.

At block 1204, module 204 is configured to select an addition or subtraction operation to be scheduled in the first stage of the execution schedule responsive to the addition or subtraction operation meeting the first condition. The addition or subtraction operation is a mathematical operation where the mathematical operation is for addition responsive to having an addition operator, where the mathematical operation is for subtraction responsive to having a subtraction operator.

At block 1206, module 204 is configured to perform a process comprising: selecting another multiplication operation to be scheduled in a next stage of the execution schedule responsive to the another multiplication operation meeting the first condition or a second condition, the second condition comprising having a dependency that is fulfilled by a previous stage at block 1208; selecting another addition or subtraction operation to be scheduled in the next stage of the execution schedule responsive to the another addition or subtraction operation meeting the first condition or the second condition at block 1210; and repeating the process until each of the operations in the data have been scheduled in the execution schedule for subsequent stages, wherein the execution schedule is configured for execution by an arithmetic logic unit (ALU) (e.g., ALU 210A) at block 1212.

The ALU is a single unit (e.g., ALU 210A). The ALU comprises a multiplication block (e.g., multiplication block 604) and an addition and subtraction block (e.g., addition/subtraction block 606). Addition/subtraction block 606 performs both addition operations and subtraction operations. The execution schedule (e.g., one field ALU schedule 250 which can be illustrated as point double schedule 400 and point add schedule 500) comprises at least one multiplication operation and at least one addition or subtraction operation in a same stage which cause the ALU (e.g., ALU 210A) to process the at least one multiplication operation and the at least one addition or subtraction operation simultaneously. For example, point double schedule 400 illustrates the second stage for first block 402 and second block 404 which is executed simultaneously in ALU 210A.

The ALU (e.g., depicted in FIG. 6) comprises a single multiplication block 604 electrically connected in a circuit to be in parallel with a single addition and subtraction block 606. Module 204 causes the ALU 210 to execute the operations in the execution schedule. Module 204 can call, instruct, initiate, activate, etc., ALU 210 to execute the execution schedule such that the operations are performed in order of the stages.

The process executed by module 204 further comprises selecting one multiplication operation from the execution schedule (e.g., one field ALU schedule 250) to be processed by another ALU and selecting another one multiplication operation from the execution schedule to be processed by the another ALU, while ensuring that the first condition or the second condition is met. Module 204 is configured to comprising cause the ALU (e.g., ALU 210A) and the another ALU (e.g., ALU 210B) to execute the operations in the execution schedule (e.g., one field ALU schedule 250 is updated, changed, and/or modified to be two field ALU schedule 252).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
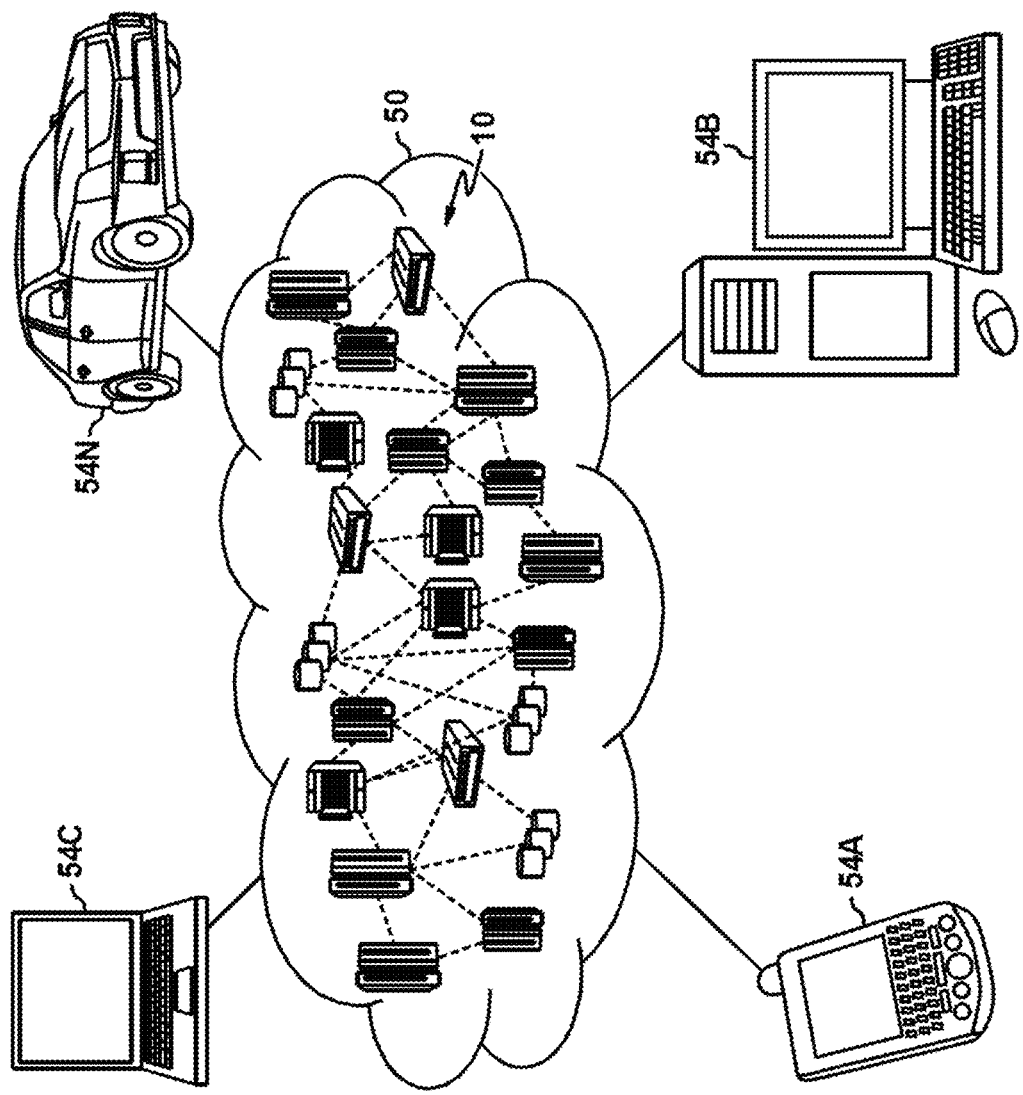
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
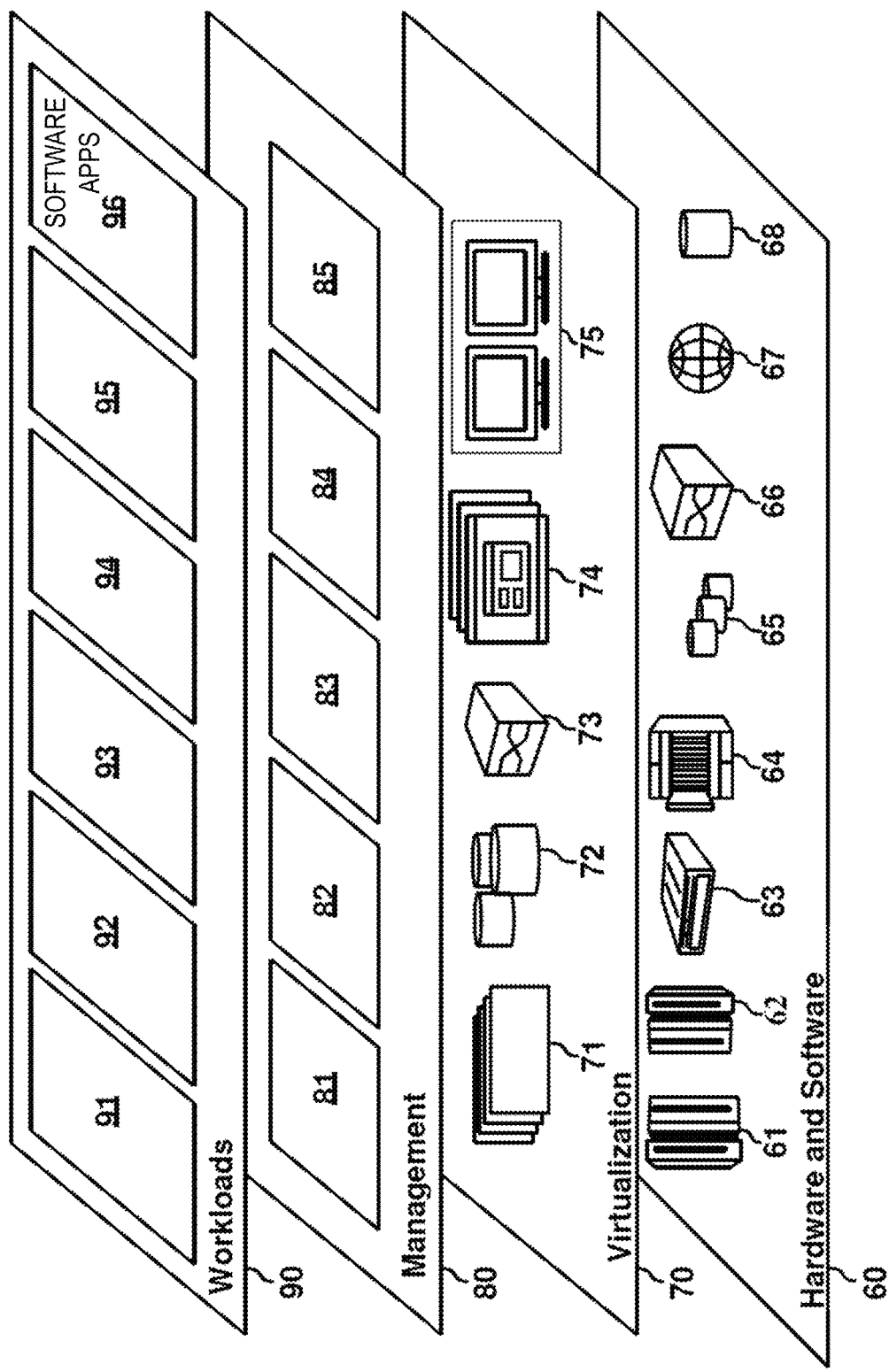
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., module 204 as one or more software applications) implemented in workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   selecting from data a multiplication operation to be scheduled in a first stage of an execution schedule for execution on an arithmetic logic unit (ALU), the multiplication operation meeting a first condition of having no dependency, the data comprising operations;
   selecting a mathematical operation to be scheduled in the first stage of the execution schedule responsive to the mathematical operation meeting the first condition, wherein the mathematical operation is for addition in the first stage of the execution schedule for execution on the ALU responsive to comprising an addition operator, wherein the mathematical operation is for subtraction in the first stage of the execution schedule for execution on the ALU responsive to comprising a subtraction operator, executing the multiplication operation in the first stage encompassing an execution time for the mathematical operation in the first stage;
   performing a process comprising:
      selecting another multiplication operation to be scheduled in a next stage of the execution schedule responsive to the another multiplication operation meeting a condition of a plurality of conditions, the plurality of conditions comprising the first condition and a second condition, the second condition comprising having a dependency that is fulfilled by a previous stage; and
      selecting another mathematical operation to be scheduled in the next stage of the execution schedule responsive to the another mathematical operation meeting the condition; and
   repeating the process until each of the operations in the data have been scheduled in the execution schedule for subsequent stages, wherein the execution schedule is configured for execution by the ALU.

2. The computer-implemented method of claim 1, wherein the ALU is a single unit.

3. The computer-implemented method of claim 1, wherein the ALU comprises a multiplication block and an addition and subtraction block.

4. The computer-implemented method of claim 1, wherein the execution schedule comprises at least one multiplication operation and at least one mathematical operation in a same stage which cause the ALU to process the at least one multiplication operation and the at least one mathematical operation simultaneously.

5. The computer-implemented method of claim 1, wherein the ALU comprises a single multiplication block electrically connected in a circuit to be in parallel with a single addition and subtraction block.

6. The computer-implemented method of claim 1, further comprising causing the ALU to execute the operations in the execution schedule.

7. The computer-implemented method of claim 1, wherein the process further comprises:
   selecting one multiplication operation from the execution schedule to be processed by another ALU; and
   selecting another one multiplication operation from the execution schedule to be processed by the another ALU, while ensuring that the first condition or the second condition is met.

8. A system comprising:
   a memory having computer readable instructions; and
   one or more processors for executing the computer readable instructions, the computer readable instructions controlling the one or more processors to perform operations comprising:
      selecting from data a multiplication operation to be scheduled in a first stage of an execution schedule for execution on an arithmetic logic unit (ALU), the multiplication operation meeting a first condition of having no dependency, the data comprising operations;
      selecting a mathematical operation for addition to be scheduled in the first stage of the execution schedule for execution on the ALU responsive to the mathematical operation meeting the first condition, executing the multiplication operation in the first stage encompassing an execution time for the mathematical operation in the first stage;
      performing a process comprising:
         selecting another multiplication operation to be scheduled in a next stage of the execution schedule responsive to the another multiplication operation meeting a condition of a plurality of conditions, the plurality of conditions comprising the first condition and a second condition, the second condition comprising having a dependency that is fulfilled by a previous stage; and
         selecting another mathematical operation to be scheduled in the next stage of the execution schedule responsive to the another mathematical operation meeting the condition; and
      repeating the process until each of the operations in the data have been scheduled in the execution schedule for subsequent stages, wherein the execution schedule is configured for execution by the ALU.

9. The system of claim 8, wherein the ALU is a single unit.

10. The system of claim 8, wherein the ALU comprises a multiplication block and an addition and subtraction block.

11. The system of claim 8, wherein the execution schedule comprises at least one multiplication operation and at least one mathematical operation in a same stage which cause the ALU to process the at least one multiplication operation and the at least one mathematical operation simultaneously.

12. The system of claim 8, wherein the ALU comprises a single multiplication block electrically connected in a circuit to be in parallel with a single addition and subtraction block.

13. The system of claim 8, further comprising causing the ALU to execute the operations in the execution schedule.

14. The system of claim 8, wherein the process further comprises:
  selecting one multiplication operation from the execution schedule to be processed by another ALU; and
  selecting another one multiplication operation from the execution schedule to be processed by the another ALU, while ensuring that the first condition or the second condition is met.

15. A computer program product comprising a computer readable storage medium having program instructions embodied therewith, the program instructions executable by a processor to cause the processor to perform operations comprising:
  selecting from data a multiplication operation to be scheduled in a first stage of an execution schedule for execution on an arithmetic logic unit (ALU), the multiplication operation meeting a first condition of having no dependency, the data comprising operations;
  selecting a mathematical operation for addition to be scheduled in the first stage of the execution schedule for execution on the ALU responsive to the mathematical operation meeting the first condition, executing the multiplication operation in the first stage encompassing an execution time for the mathematical operation in the first stage;
  performing a process comprising:
    selecting another multiplication operation to be scheduled in a next stage of the execution schedule responsive to the another multiplication operation meeting a condition of a plurality of conditions, the plurality of conditions comprising the first condition and a second condition, the second condition comprising having a dependency that is fulfilled by a previous stage; and
    selecting another mathematical operation to be scheduled in the next stage of the execution schedule responsive to the another mathematical operation meeting the condition; and
  repeating the process until each of the operations in the data have been scheduled in the execution schedule for subsequent stages, wherein the execution schedule is configured for execution by the ALU.

16. The computer program product of claim 15, wherein the ALU is a single unit.

17. The computer program product of claim 15, wherein the ALU comprises a multiplication block and an addition and subtraction block.

18. The computer program product of claim 15, wherein the execution schedule comprises at least one multiplication operation and at least one mathematical operation in a same stage which cause the ALU to process the at least one multiplication operation and the at least one mathematical operation simultaneously.

19. The computer program product of claim 15, wherein the ALU comprises a single multiplication block electrically connected in a circuit to be in parallel with a single addition and subtraction block.

20. The computer program product of claim 15, further comprising causing the ALU to execute the operations in the execution schedule.

* * * * *